(12) United States Patent
Choi

(10) Patent No.: US 8,587,578 B2
(45) Date of Patent: Nov. 19, 2013

(54) PIXEL AND ORGANIC LIGHT EMITTING DISPLAY DEVICE

(75) Inventor: Sang-Moo Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 434 days.

(21) Appl. No.: 12/869,631

(22) Filed: Aug. 26, 2010

(65) Prior Publication Data

US 2011/0157125 A1 Jun. 30, 2011

(30) Foreign Application Priority Data

Dec. 31, 2009 (KR) .......................... 10-2009-0135194

(51) Int. Cl.
*G06F 3/038* (2013.01)
*G09G 3/30* (2006.01)
*H05B 37/00* (2006.01)

(52) U.S. Cl.
USPC .......................... 345/211; 345/76; 315/169.3

(58) Field of Classification Search
USPC ............. 345/45, 46, 39, 36, 73–84, 204–215, 345/690–699; 315/169.1–169.4
See application file for complete search history.

(56) References Cited

U.S. PATENT DOCUMENTS

| | | | |
|---|---|---|---|
| 2007/0035487 A1* | 2/2007 | Ryu et al. .......................... | 345/76 |
| 2007/0200814 A1* | 8/2007 | Kwon .............................. | 345/92 |
| 2008/0211397 A1* | 9/2008 | Choi .............................. | 313/504 |
| 2008/0252569 A1* | 10/2008 | Kwon .............................. | 345/76 |
| 2009/0225010 A1* | 9/2009 | Kimura .......................... | 345/76 |

FOREIGN PATENT DOCUMENTS

| | | |
|---|---|---|
| KR | 10-2007-0027265 A | 3/2007 |
| KR | 10-2007-0083072 | 8/2007 |
| KR | 10-2008-0013730 | 2/2008 |
| KR | 10-0836431 B1 | 6/2008 |
| KR | 10-2008-0080753 A | 9/2008 |
| KR | 10-2009-0023927 A | 3/2009 |

OTHER PUBLICATIONS

KIPO Office Action dated May 18, 2011 for KR Application No. 10-2009-0135194 (1 page).

* cited by examiner

*Primary Examiner* — Kent Chang
*Assistant Examiner* — Scott Au
(74) *Attorney, Agent, or Firm* — Christie, Parker & Hale, LLP

(57) ABSTRACT

There are provided a pixel capable of displaying images with a desired luminance and an organic light emitting display device using the same. In one embodiment, a pixel includes: an organic light emitting diode, a first transistor for controlling an amount of current flowing from a first power source to a second power source via the organic light emitting diode, a second transistor coupled between a first electrode of the first transistor and a data line and configured to be turned on when a current scan signal is supplied a current scan line a third transistor coupled between a gate electrode of the first transistor and a second electrode of the first transistor, a first capacitor coupled between the first power source and the first electrode of the first transistor, and a second capacitor coupled between the gate electrode of the first transistor and the first power source.

22 Claims, 6 Drawing Sheets

Compensation period
of threshold voltage

PIXEL AND ORGANIC LIGHT EMITTING DISPLAY DEVICE

CROSS-REFERENCE TO RELATED APPLICATION

This application claims priority to and the benefit of Korean Patent Application No. 10-2009-0135194, filed on Dec. 31, 2009, in the Korean Intellectual Property Office, the entire content of which is incorporated herein by reference.

BACKGROUND

1. Field

The following description relates to a pixel and an organic light emitting display device using the same, and more particularly, to a pixel capable of displaying images with a desired luminance and an organic light emitting display device using the same.

2. Description of Related Art

Various types of flat panel display devices that are lighter in weight and smaller in volume than comparably sized cathode ray tube displays have recently been developed. The types of flat panel display devices include a liquid crystal display device, a field emission display device, a plasma display panel, an organic light emitting display device, and the like.

Among these flat panel display devices, the organic light emitting display device displays images using organic light emitting diodes that emit light through recombination of electrons and holes. The organic light emitting display device has a fast response speed and is driven with low power consumption.

SUMMARY

Aspect of embodiments of the present invention are directed toward a pixel capable of stably compensating the threshold voltage of a driving transistor regardless of driving frequencies and an organic light emitting display device using the same.

According to an embodiment of the present invention, there is provided a pixel including an organic light emitting diode; a first transistor for controlling an amount of current flowing from a first power source to a second power source via the organic light emitting diode; a second transistor coupled between a first electrode of the first transistor and a data line and configured to be turned on when a current scan signal is supplied a current scan line; a third transistor coupled between a gate electrode of the first transistor and a second electrode of the first transistor; a first capacitor coupled between the first power source and the first electrode of the first transistor; and a second capacitor coupled between the gate electrode of the first transistor and the first power source.

The third and second transistors may be configured such that at most one of the third and second transistors is turned on at any time. The third transistor may be configured to be turned on after the second transistor is turned on. The pixel may further include a fourth transistor coupled between the gate electrode of the first transistor and an initialization power source and configured to be turned on when the current scan signal is supplied to the current scan line. The third transistor may be configured to be a turned on for a longer time than the second transistor is configured to be turned on. The first capacitor may have a larger capacitance than the second capacitor. The second capacitor may be configured to be charged by a voltage supplied from the first capacitor after the second transistor is turned off. The pixel may further include a fourth transistor coupled in parallel with the third transistor between the gate electrode of the first transistor and the second electrode of the first transistor and configured to be turned on when the current scan signal is supplied to the current scan line. The third transistor may be configured to be turned on when a next scan signal is supplied to a next scan line after the current scan signal is supplied to the current scan line. The pixel may further include a fourth transistor coupled between the gate electrode of the first transistor and an initialization power source and configured to be turned on when a previous scan signal is supplied to a previous scan line. The pixel may further include a fourth transistor coupled between the first electrode of the first transistor and the first power source; and a fifth transistor coupled between the second electrode of the first transistor and the organic light emitting diode, and the fifth and sixth transistors may be configured to be turned off during a period in which the second and third transistors are turned on.

According to another aspect of the present invention, there is provided an organic light emitting display device including a scan driver for supplying a plurality of scan signals to a plurality of scan lines and supplying a plurality of control signals to a plurality of emission control lines; a data driver for supplying a plurality of data signals to a plurality of data lines in synchronization with the scan signals; and a plurality of pixels positioned at crossing regions of the scan lines and data lines, wherein each of the pixels positioned on an i-th (i is a natural number) horizontal line includes: an organic light emitting diode; a first transistor for controlling an amount of current flowing from a first power source to a second power source via the organic light emitting diode; a second transistor coupled between a first electrode of the first transistor and a data line of the data lines and configured to be turned on when a scan signal of the scan signals is supplied an i-th scan line of the scan lines; a third transistor coupled between a gate electrode of the first transistor and a second electrode of the first transistor, the third and second transistors being configured such that at most one of the third and second transistors is turned on at any time; a first capacitor coupled between the first power source and the first electrode of the first transistor; and a second capacitor coupled between the gate electrode of the first transistor and the first power source.

The third transistor may be configured to be turned on when a scan signal is supplied to an (i+1)-th scan line.

The organic light emitting display device may further include a fourth transistor coupled in parallel with the third transistor between the gate electrode of the first transistor and the second electrode of the first transistor and configured to be turned on when the scan signal is supplied to the i-th scan line.

The organic light emitting display device may further include a control line driver configured to sequentially supply a plurality of control signals to a plurality of control lines extending in a direction parallel with the scan lines, each of the control signals having a width wider than a width of the scan signal.

The control line driver may be configured to supply a control signal of the control signals to an i-th control line of the control lines after the scan signal is supplied to the i-th scan line.

The scan driver may be configured to supply an emission control signal of the emission control signals to an i-th emission control line of the emission control lines so that the emission control signal overlaps with the scan signal supplied to the i-th scan line and the control signal supplied to the i-th control line.

The third transistor may be configured to be turned on when the control signal is supplied to the i-th control line.

The organic light emitting display device may further include a fourth transistor coupled between the gate electrode of the first transistor and an initialization power source and configured to be turned on when a scan signal of the scan signals is supplied to an (i−1)-th scan line of the scan lines.

The organic light emitting display device may further include a fourth transistor coupled between the first electrode of the first transistor and the first power source and configured to be turned on when the emission control signal is supplied to the i-th emission control line; and a fifth transistor coupled between the second electrode of the first transistor and the organic light emitting diode and configured to be turned on when the emission control signal is supplied to the i-th emission control line.

The organic light emitting display device may further include a fourth transistor coupled between the gate electrode of the first transistor and an initialization power source and configured to be turned on when the scan signal is supplied to the i-th scan line.

The first capacitor may have a larger capacitance than the second capacitor.

In a pixel or an organic light emitting display device using the same according to an embodiment of the present invention, the charge period of the threshold voltage of a driving transistor can be set regardless of the width of a scan signal. Accordingly, the organic light emitting display device can be applied to high-speed driving. Practically, the threshold voltage of the driving transistor is charged during a period of which width is wider than that of one horizontal period in which the scan signal is supplied. Accordingly, images with uniform luminance can be displayed.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
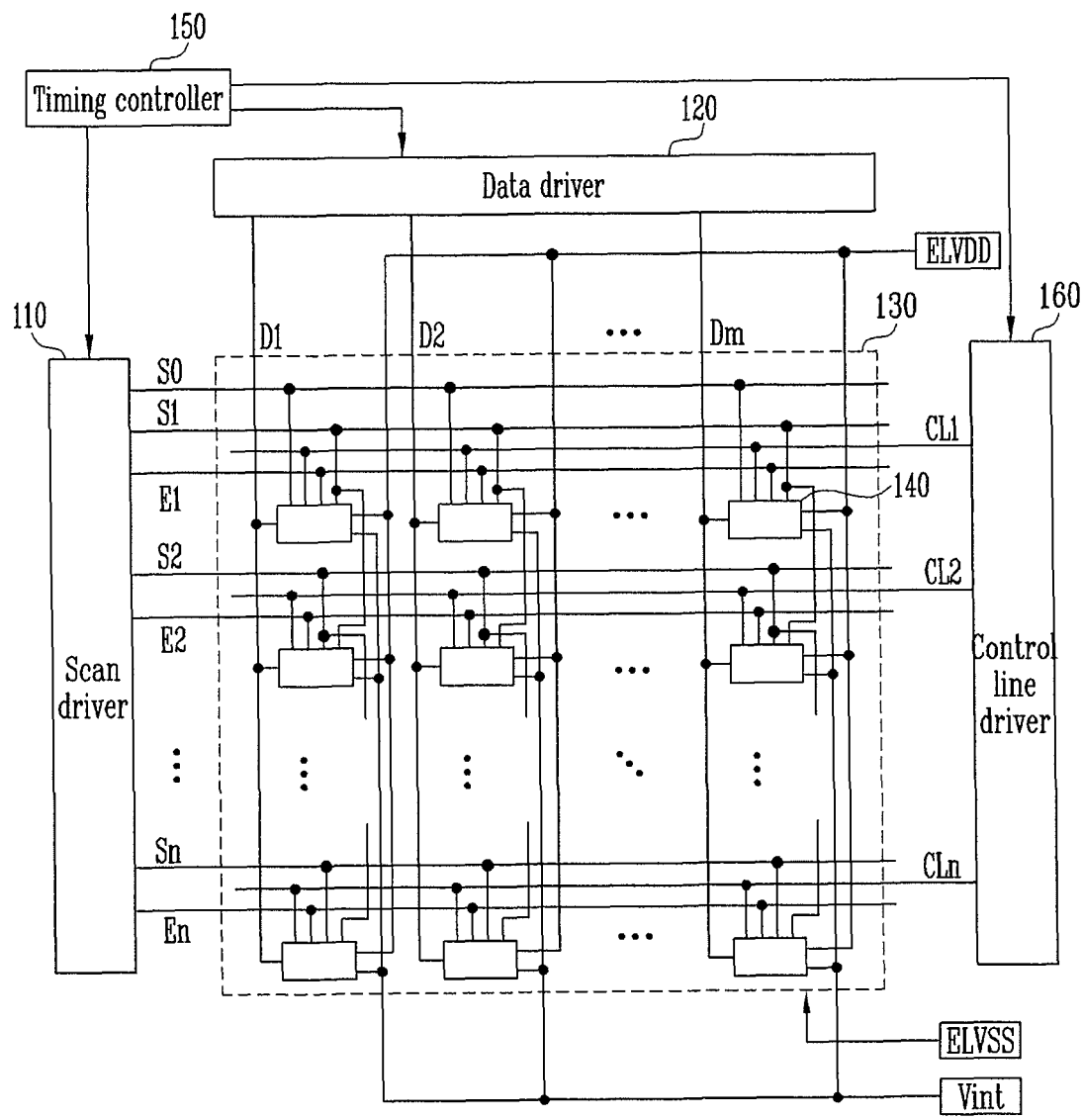
FIG. 1 is a block diagram of an organic light emitting display device according to an embodiment of the present invention.

Hereinafter, certain exemplary embodiments of the present invention will be described with reference to the accompanying drawings. Here, when a first element is described as being coupled to a second element, the first element may be not only directly coupled to the second element but may also be indirectly coupled to the second element via one or more third elements. Further, some of the elements that are not essential to the complete understanding of the invention are omitted for clarity. Also, like reference numerals refer to like elements throughout.

An organic light emitting display device has a plurality of pixels arranged in a matrix form at crossing regions of data lines, scan lines and power lines. Each of the pixels usually includes an organic light emitting diode, two or more transistors including a driving transistor (or drive transistor), and one or more capacitors.

Such an organic light emitting display device has low power consumption. However, in the organic light emitting display device, an amount of current that flows into an organic light emitting diode changes depending on (or due to) the variation in the threshold voltage of a driving transistor included in each pixel, and therefore, images with unequal luminance are displayed. That is, characteristics of the driving transistor change depending on the fabrication factor of the driving transistor included in each of the pixels. It is practically impossible in the current fabrication process to fabricate the organic light emitting display device so that all transistors of the organic light emitting display device have the same characteristics. Therefore, variations in the threshold voltages of the driving transistors occur.

To reduce or solve such a problem, a compensation circuit including a plurality of transistors and capacitors to each of the pixels has been proposed. The compensation circuit included in each of the pixels charges a voltage corresponding to the threshold voltage of the driving transistor during one horizontal period. Accordingly, the variations in the threshold voltages of the driving transistors are compensated.

Recently, there has been required a method of driving a driving transistor at a driving frequency of over 120 Hz so as to remove or reduce a motion blur phenomenon. However, when the driving transistor is driven at a high frequency of over 120 Hz, the period for charging the threshold voltage of the driving transistor is shortened, and therefore, it is difficult to compensate for the threshold voltage of the driving transistor.

FIG. 1 is a block diagram of an organic light emitting display device according to an embodiment of the present invention.

Referring to FIG. 1, the organic light emitting display device according to one embodiment of the present invention includes pixels 140 positioned at crossing regions of scan lines S0 to Sn, emission control lines E1 to En, control lines CL1 to CLn and data lines D1 to Dm; a pixel unit (or display region) 130 having the pixels disposed in a matrix form; a scan driver 110 for driving the scan lines S0 to Sn and the emission control lines E1 to En; a data driver 120 for driving the data lines D1 to Dm; a control line driver 160 for driving the control lines CL1 to CLn; and a timing controller 150 for controlling the scan driver 110, the data driver 120 and the control line driver 160.

The control line driver 160 sequentially supplies control signals to the control lines CL1 to CLn. Here, the control signal supplied to an i-th (i is a natural number) control line CLi is supplied after a scan signal is supplied to an i-th scan line Si. The pixels 140 having the control signal supplied thereto charge a voltage corresponding to the threshold voltage of a driving transistor and a data signal during a period in which the control signal is supplied. Here, the control signal is set to have a wider width than the scan signal so that the threshold voltage of the driving transistor can be stably compensated.

The scan driver 110 sequentially supplies scan signals to the scan lines S0 to Sn, and sequentially supplies emission control signals to the emission control lines E1 to En. Here, the emission control signal supplied to an i-th emission control line Ei is supplied to overlap with the scan signal supplied to the i-th scan line Si and the control signal supplied to the i-th control line CLi. Also, the emission control signal supplied to the i-th emission control line Ei corresponding to each of the pixels 140 may be supplied to overlap with the scan signal supplied to an (i−1)-th scan line Si−1, in addition to the scan signal supplied to the i-th scan line Si and the control signal supplied to the i-th control line CLi.

The data driver 120 supplies data signals to the data lines D1 to Dm in synchronization with the scan signals.

The timing controller 150 controls the scan driver 110, the data driver 120 and the control line driver 160 in response to a synchronization signal supplied from the exterior (or outside) of the organic light emitting display device.

The pixel unit 130 has pixels 140 formed at crossing regions of the scan lines S0 to Sn and the data lines D1 to Dm. The pixels 140 receive a first power of a first power source ELVDD, a second power of a second power source ELVSS and an initialization power of an initialization power source Vint, supplied from the exterior (or outside) of the organic light emitting display device. Each of the pixels 140 controls an amount of current that flows from the first power source ELVDD to the second power source ELVSS via an organic light emitting diode in response to the data signal.

Figure 2:
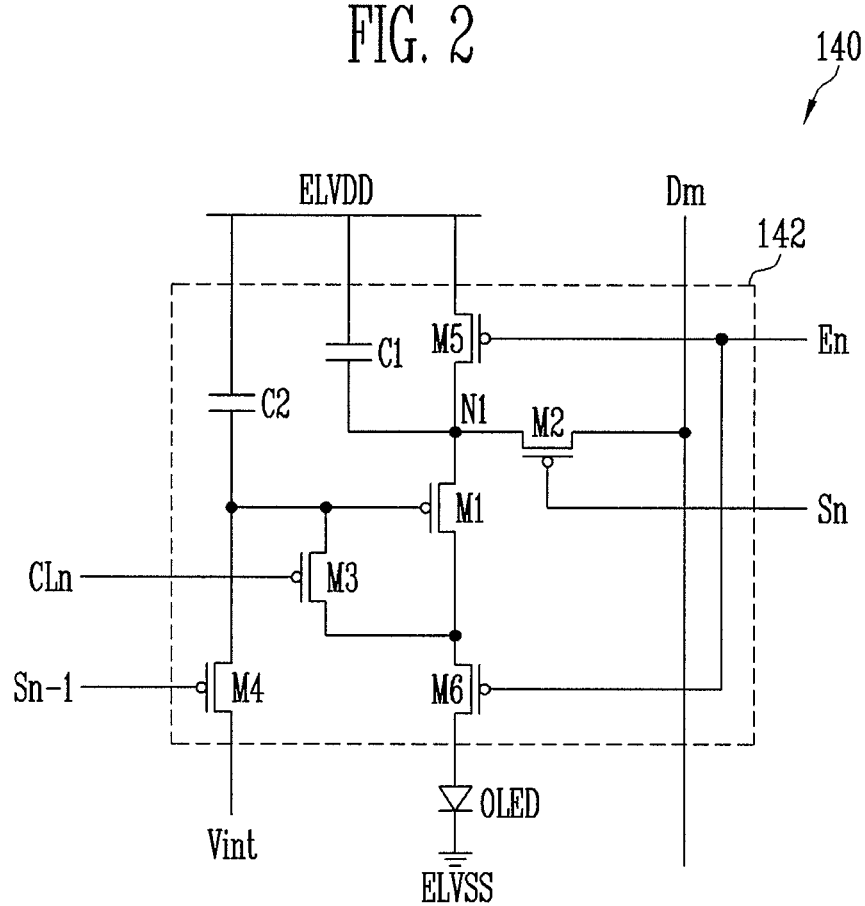
FIG. 2 is a circuit diagram illustrating an embodiment of a pixel illustrated in FIG. 1.

FIG. 2 is a circuit diagram illustrating an embodiment of a pixel illustrated in FIG. 1. For convenience of illustration, a pixel coupled to an m-th data line Dm, an n-th scan line Sn and an (n−1)-th scan line Sn−1 is illustrated in FIG. 2.

The pixel 140 of the embodiment shown in FIG. 2 includes an organic light emitting diode OLED and a pixel circuit 142 coupled to the data line Dm, the scan lines Sn−1 and Sn, an emission control line En and a control line CLn so as to control the amount of current supplied to the organic light emitting diode OLED.

An anode electrode of the organic light emitting diode OLED is coupled to the pixel circuit 142, and a cathode electrode of the organic light emitting diode OLED is coupled to a second power source ELVSS. Here, the second power source ELVSS is set to have a lower voltage than a first power source ELVDD. The organic light emitting diode OLED generates light with a luminance (e.g., a predetermined luminance) corresponding to the amount of current supplied from the pixel circuit 142.

The pixel circuit 142 controls the amount of current supplied to the organic light emitting diode OLED in response to a data signal. To this end, the pixel circuit 142 includes first to sixth transistors M1 to M6 and first and second capacitors C1 and C2.

A first electrode of the second transistor M2 is coupled to the data line Dm, and a second electrode of the second transistor M2 is coupled to a first node N1. A gate electrode of the second transistor M2 is coupled to the n-th scan line Sn. When a scan signal is supplied to the n-th scan line Sn, the second transistor M2 is turned on to supply a data signal supplied to the data line Dm to the first node N1.

A first electrode of the first transistor M1 (a driving transistor) is coupled to the first node N1, and a second electrode of the first transistor M1 is coupled to a first electrode of the sixth transistor M6. A gate electrode of the first transistor M1 is coupled to a first terminal of the second capacitor C2. The first transistor M1 supplies current corresponding to a voltage charged in the second capacitor C2 to the organic light emitting diode OLED.

A first electrode of the third transistor M3 is coupled to the second electrode of the first transistor M1, and a second electrode of the third transistor M3 is coupled to the gate electrode of the first transistor M1. A gate electrode of the third transistor M3 is coupled to the control line CLn. When a control signal is supplied to the control line CLn, the third transistor M3 is turned on to diode-couple the first transistor M1.

A gate electrode of the fourth transistor M4 is coupled to the (n−1)-th scan line, and a first electrode of the fourth transistor M4 is coupled to the first terminal of the second capacitor C2 and the gate electrode of the first transistor M1. A second electrode of the fourth transistor M4 is coupled to an initialization power source Vint. When a scan signal is supplied to the (n−1)-th scan line Sn−1, the fourth transistor M4 is turned on to supply the voltage of the initialization power source Vint to the first terminal of the second capacitor C2 and the gate electrode of the first transistor M1.

A first electrode of the fifth transistor M5 is coupled to the first power source ELVDD, and a second electrode of the fifth transistor M5 is coupled to the first node N1. A gate electrode of the fifth transistor M5 is coupled to the emission control line En. When no emission control signal is supplied from the emission control line En, the fifth transistor M5 is turned on to electrically connect the first power source ELVDD and the first node N1 to each other.

The first electrode of the sixth transistor M6 is coupled to the second electrode of the first transistor M1, and a second electrode of the sixth transistor M6 is coupled to the anode electrode of the organic light emitting diode OLED. A gate electrode of the sixth transistor M6 is coupled to the emission control line En. When no emission control signal is supplied from the emission control line En, the sixth transistor M6 is turned on to supply current supplied from the first transistor M1 to the organic light emitting diode OLED.

The first capacitor C1 is coupled between the first node N1 and the first power source ELVDD. During the period when the second transistor M2 is turned on, a voltage corresponding to the voltage of the data signal is charged in the first capacitor C1.

The second capacitor C2 is coupled between the gate electrode of the first transistor M1 and the first power source ELVDD. During the period when the third transistor M3 is turned on, a voltage corresponding to the voltage of the data signal and the threshold voltage of the first transistor M1 is charged in the second capacitor C2. Here, the voltage charged in the first capacitor C1 is charged in the second capacitor C2. To this end, the first capacitor C1 is formed to have a higher capacity (or larger capacitance) than the second capacitor C2.

Figure 3:
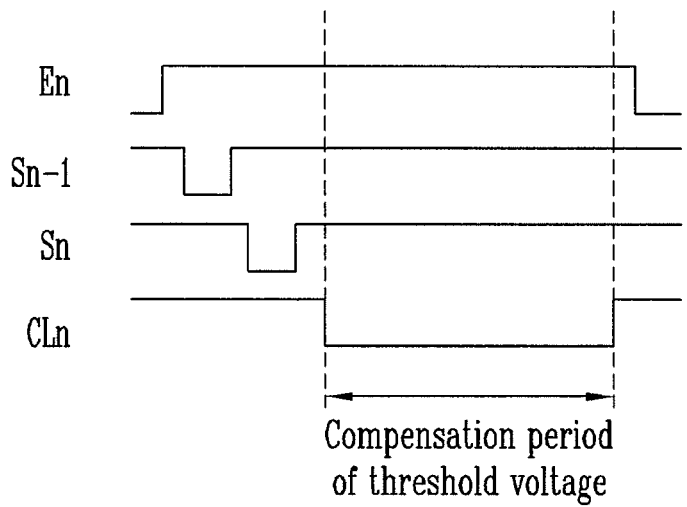
FIG. 3 is a waveform diagram illustrating a driving method of the pixel illustrated in FIG. 2.

FIG. 3 is a waveform diagram illustrating a driving method of the pixel illustrated in FIG. 2 according to one embodiment of the present invention.

The operation process of the pixel will be described in more detail in conjunction with FIGS. 2 and 3. First, an emission control signal is supplied to the emission control line En so that the fifth and sixth transistors M5 and M6 are turned off. If the fifth transistor M5 is turned off, then the first power source ELVDD and the first transistor M1 are electrically disconnected. If the sixth transistor M6 is turned off, then the first transistor M1 and the organic light emitting diode OLED are electrically disconnected. Therefore, the organic light emitting diode OLED is set to be in a non-emission state during a period in which the emission control signal is supplied to the emission control line En.

After the fifth and sixth transistors M5 and M6 are set to be in a non-emission state, a scan signal is supplied to the (n−1)-th scan line Sn−1. If the scan signal is supplied to the (n−1)-th scan line Sn−1, then the fourth transistor M4 is turned on. If the fourth transistor M4 is turned on, then the voltage of the initialization power source Vint is supplied to the first terminal of the second capacitor C2 and the gate electrode of the first transistor M1. Here, the initialization power source Vint is set to have a lower voltage than a data signal.

Subsequently, a scan signal is supplied to the n-th scan line Sn. If the scan signal is supplied to the n-th scan line Sn, then the second transistor M2 is turned on. If the second transistor M2 is turned on, then a data signal supplied from the data line Dm is supplied to the first node N1. At this time, a voltage corresponding to the voltage of the data signal is charged in the first capacitor C1.

After the voltage corresponding to the voltage of the data signal is charged in the first capacitor C1, a control signal is supplied to the n-th control line CLn. If the control signal is supplied to the n-th control line CLn, then the third transistor M3 is turned on. If the third transistor M3 is turned on, then the first transistor M1 is diode-coupled.

Here, the gate electrode of the first transistor M1 is set to have the voltage of the initialization power source Vint, and hence, the first transistor M1 is turned on. If the first transistor M1 is turned on, then the voltage charged in the first capacitor C1 is supplied to the gate electrode of the first transistor M1 via the first and third transistors M1 and M3. Thus, a voltage corresponding to the voltage of the data signal (i.e., the voltage charged in the first capacitor C1) and the threshold voltage of the first transistor M1 is charged in the second capacitor C2.

More specifically, the voltage corresponding to the voltage of the data signal is charged in the first capacitor C1 during a period in which the scan signal is supplied to the n-th scan line Sn. Subsequently, the voltage charged in the first capacitor C1 is supplied to the second capacitor C2 via the diode-coupled first transistor M1 during a period in which the control signal is supplied to the n-th control line CLn. Thus, a voltage corresponding to the voltage of the data signal and the threshold voltage of the first transistor M1 is charged in the second capacitor C2 during the period in which the control signal is supplied to the n-th control line CLn.

In addition, the period in which the control signal is supplied to the n-th control line CLn so that the threshold voltage of the first transistor M1 can be stably compensated may have a time length that is experimentally determined. For example, the period in which the control signal is supplied to the n-th control line CLn is set to be longer in time (or wider) than the supply period of the scan signal.

After the voltage corresponding to the voltage of the data signal and the threshold voltage of the first transistor M1 is charged in the second capacitor C2, the supply of the emission control signal is stopped so that the fifth and sixth transistors M5 and M6 are turned on.

If the fifth transistor M5 is turned on, then the first power source ELVDD and the first node N1 are electrically connected. If the sixth transistor M6 is turned on, then the second electrode of the first transistor M1 and the organic light emitting diode OLED are electrically coupled to each other. When both the fifth and sixth transistors M5 and M6 are turned on, the first transistor M1 supplies current corresponding to the voltage charged in the second capacitor C2 to the organic light emitting diode OLED.

In the aforementioned pixel according to the embodiment shown in FIG. 2, the compensation period of the threshold voltage of the first transistor M1 can be controlled using the width of the control signal (e.g., the time length of the compensation period can be changed by changing the time length (or width) of the control signal). Accordingly, images with a desired luminance can be displayed regardless of the driving method (e.g., high-speed driving).

Figure 4:
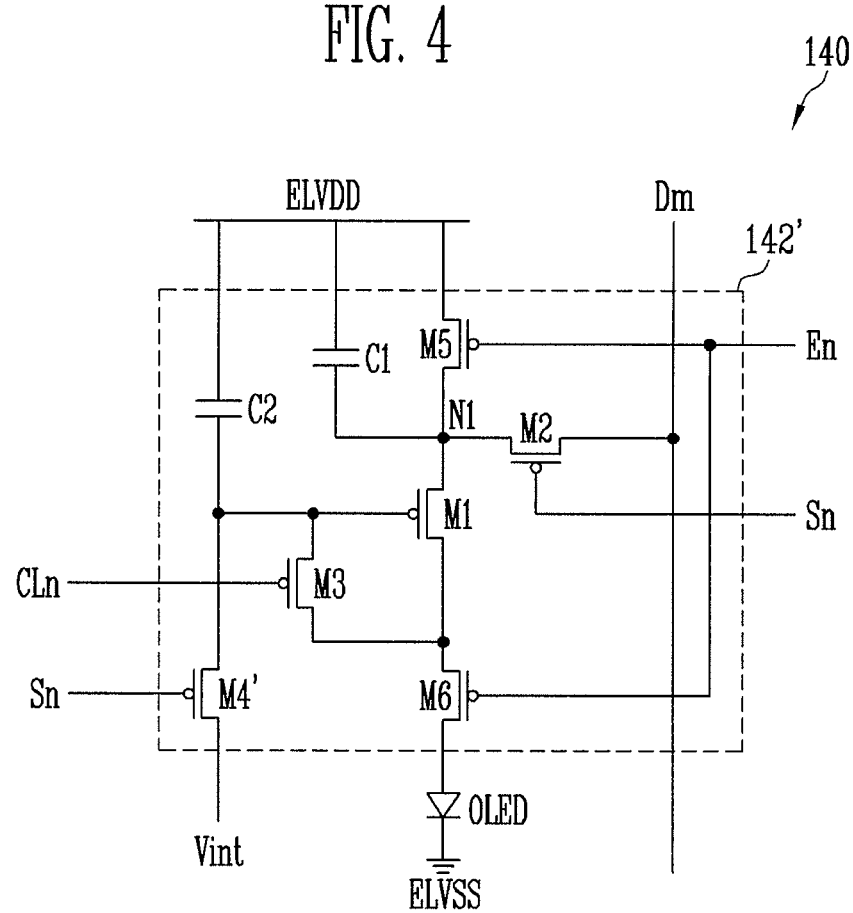
FIG. 4 is a circuit diagram illustrating another embodiment of the pixel illustrated in FIG. 1.

FIG. 4 is a circuit diagram illustrating another embodiment of the pixel illustrated in FIG. 1. In FIG. 4, components similar to those of FIG. 2 are designated by like reference numerals, and their detailed descriptions will not be provided again.

The pixel 140 of the embodiment shown in FIG. 4 includes an organic light emitting diode OLED and a pixel circuit 142' for supplying current to the organic light emitting diode OLED.

Here, a gate electrode of a fourth transistor M4' included in the pixel circuit 142' is coupled to the n-th scan line Sn. That is, when a scan signal is supplied to the n-th scan line Sn, the fourth transistor M4' is turned on to supply the initialization power source Vint to the gate electrode of the first transistor M1.

Figure 5:
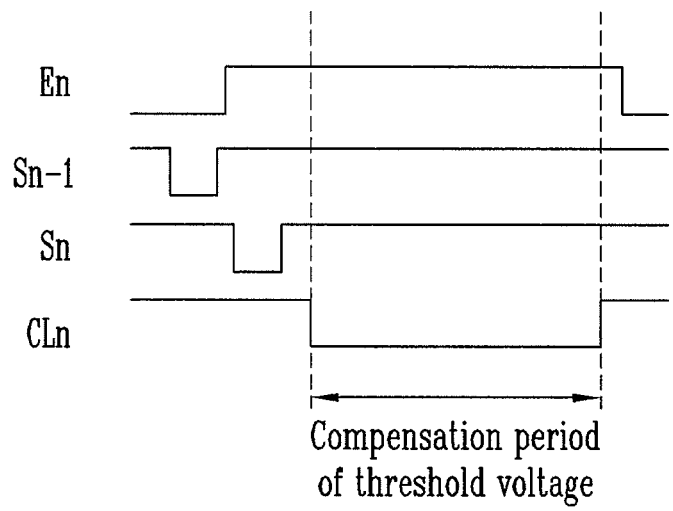
FIG. 5 is a waveform diagram illustrating a driving method of the pixel illustrated in FIG. 4.

FIG. 5 is a waveform diagram illustrating a driving method of the pixel illustrated in FIG. 4.

The operation process of the pixel will be described in conjunction with FIGS. 4 and 5. First, an emission control signal is supplied to the emission control line En so that the fifth and sixth transistors M5 and M6 are turned on. Subsequently, a scan signal is supplied to the n-th scan line Sn so that the second and fourth transistors M2 and M4' are turned on. If the second transistor M2 is turned on, then a data signal is supplied to the first node N1, and accordingly, a voltage corresponding to the voltage of the data signal is charged in the first capacitor C1. If the fourth transistor M4' is turned on, then the voltage of the initialization power source Vint is supplied to the gate electrode of the first transistor M1.

In addition, the third transistor M3 maintains a turned-off state during a period in which the scan signal is supplied to the n-th scan line Sn. Thus, although the second and fourth transistors M2 and M4' are simultaneously or concurrently turned on, the voltage of the initialization power source Vint is not supplied to the first node N1, and accordingly, the pixel 140 can be stably driven.

Subsequently, a control signal is supplied to the n-th control line CLn so that the third transistor M3 is turned on. At this time, a voltage corresponding to the voltage of the data signal and the threshold voltage of the first transistor M1 is charged in the second capacitor C2 during a period in which the third transistor M3 is turned on. After the voltage corresponding to the voltage of the data signal and the threshold voltage of the first transistor M1 is charged in the second capacitor C2, the supply of the emission control signal is stopped so that the fifth and sixth transistors M5 and M6 are turned on. Subsequently, the first transistor M1 supplies current corresponding to the voltage charged in the second capacitor C2 to the organic light emitting diode OLED.

Figure 6:
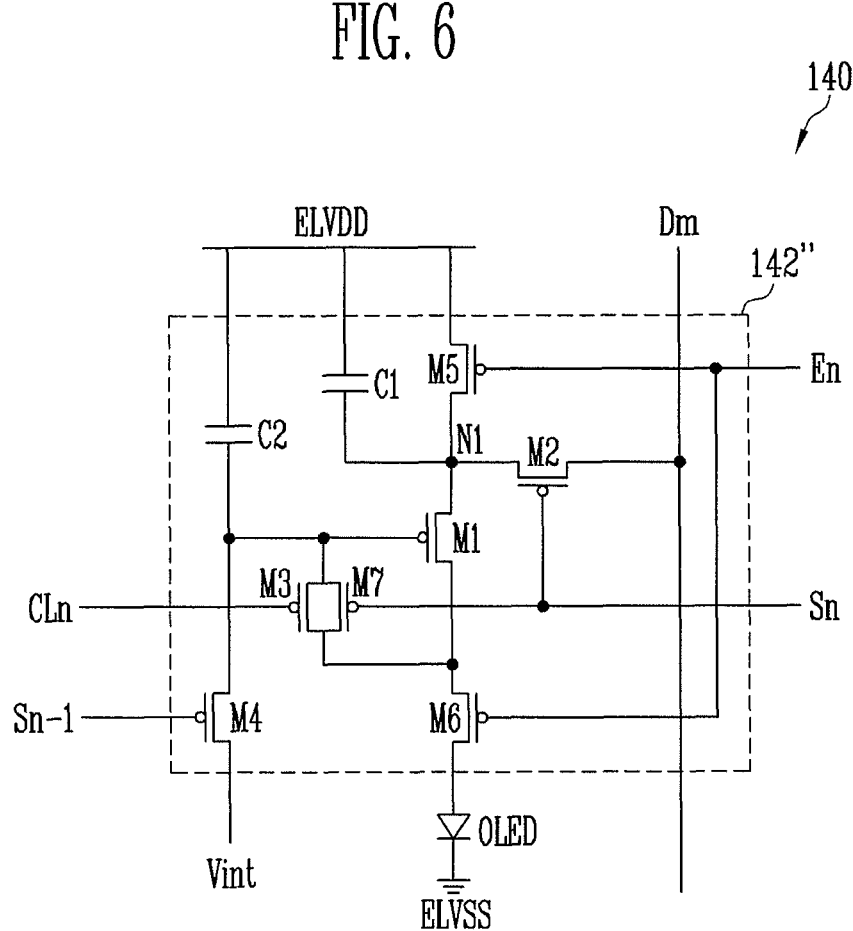
FIG. 6 is a circuit diagram illustrating still another embodiment of the pixel illustrated in FIG. 1.

FIG. 6 is a circuit diagram illustrating still another embodiment of the pixel illustrated in FIG. 1. In FIG. 6, components similar to those of FIG. 2 are designated by like reference numerals, and their detailed descriptions will not be provided again.

Referring to FIG. 6, the pixel 140 of this embodiment includes an organic light emitting diode OLED, and a pixel circuit 142" for supplying current to the organic light emitting diode OLED.

Here, the pixel circuit 142" is further provided with a seventh transistor M7. The seventh transistor M7 is coupled between the gate electrode and second electrode of the first transistor M1. That is, the seventh transistor M7 is coupled in parallel with the third transistor M3. When a scan signal is supplied to the n-th scan line Sn, the seventh transistor M7 is turned on.

Figure 7:
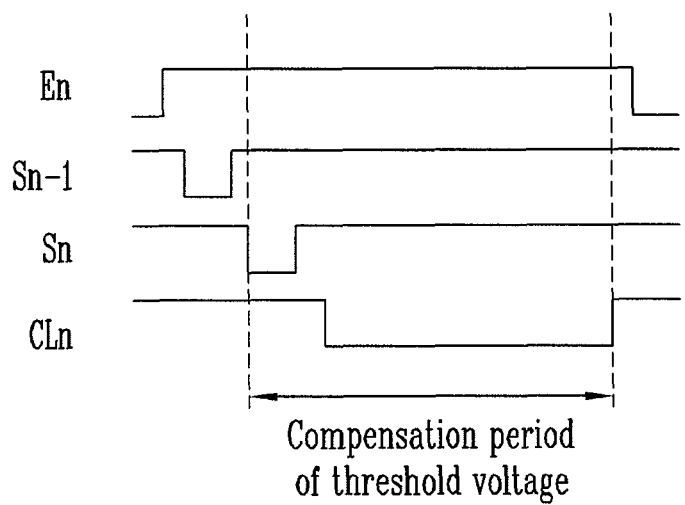
FIG. 7 is a waveform diagram illustrating a driving method of the pixel illustrated in FIG. 6.

FIG. 7 is a waveform diagram illustrating a driving method of the pixel illustrated in FIG. 6. The driving waveforms illustrated in FIG. 7 are similar to those illustrated in FIG. 3. However, in the driving waveforms applied to the pixel of FIG. 6, a threshold voltage compensation period is partially changed (i.e., is slightly different from the corresponding period in the embodiment of FIG. 3).

The operation process of the pixel will be described in conjunction with FIGS. 6 and 7. First, an emission control signal is supplied to the emission control line En so that the fifth and sixth transistors M5 and M6 are turned on. After the fifth and sixth transistors M5 and M6 are turned on, a scan signal is supplied to the (n−1)-th scan line Sn−1 so that the fourth transistor M4 is turned on. If the fourth transistor M4 is turned on, then the voltage of the initialization power source Vint is supplied to the gate electrode of the first transistor M1.

Subsequently, a scan signal is supplied to the n-th scan line Sn so that the second and seventh transistors M2 and M7 are turned on. If the second transistor M2 is turned on, then a data signal is supplied to the first node N1, and accordingly, a voltage corresponding to the voltage of the data signal is charged in the first capacitor C1. If the seventh transistor M7 is turned on, then the data signal supplied to the first node N1 is supplied to the gate electrode of the first transistor M1 via the first and seventh transistors M1 and M7. At this time, a voltage corresponding to the voltage of the data signal and the threshold voltage of the first transistor M1 is charged in the second capacitor C2. That is, during a period in which the scan signal is supplied to the n-th scan line Sn, the voltage corresponding to the voltage of the data signal is charged in the first capacitor C1, and the voltage corresponding to the voltage of the data signal and the threshold voltage of the first transistor M1 is charged in the second capacitor C2.

Subsequently, a control signal is supplied to the n-th control line CLn so that the third transistor M3 is turned on. If the third transistor M3 is turned on, then the voltage charged in the first capacitor C1 is supplied to the gate electrode of the first transistor M1 via the third transistor M3. Then, the voltage corresponding to the voltage of the data signal and the threshold voltage of the first transistor M1 is charged (e.g., continuously charged) in the second transistor C2.

More specifically, the voltage supplied to the first node N1 is supplied via the switch-type second transistor M2 during a period in which the scan signal is supplied to the n-th scan line Sn. Thus, the voltage at the first node N1 is increased up to the voltage of the data signal in a short time (i.e., in a time when the scan signal is supplied). However, the voltage supplied to the first terminal of the second capacitor C2 is supplied via the diode-coupled first transistor M1 during the period in which the scan signal is supplied to the n-th scan line Sn. In this case, the voltage at the first terminal of the second capacitor C2 is not increased up to a desired voltage during the period in which the scan signal is supplied to the n-th scan line Sn. Thus, the third transistor M3 is turned on during a period in which the control signal is supplied to the control line CLn, so that the voltage at the first terminal of the second capacitor C2 is increased up to the desired voltage.

After the voltage corresponding to the voltage of the data signal and the threshold voltage of the first transistor M1 is charged in the second capacitor C2, the supply of the emission control signal is stopped so that the fifth and sixth transistors M5 and M6 are turned on. Subsequently, the first transistor M1 supplies current corresponding to the voltage charged in the second capacitor C2 to the organic light emitting diode OLED.

Figure 8:
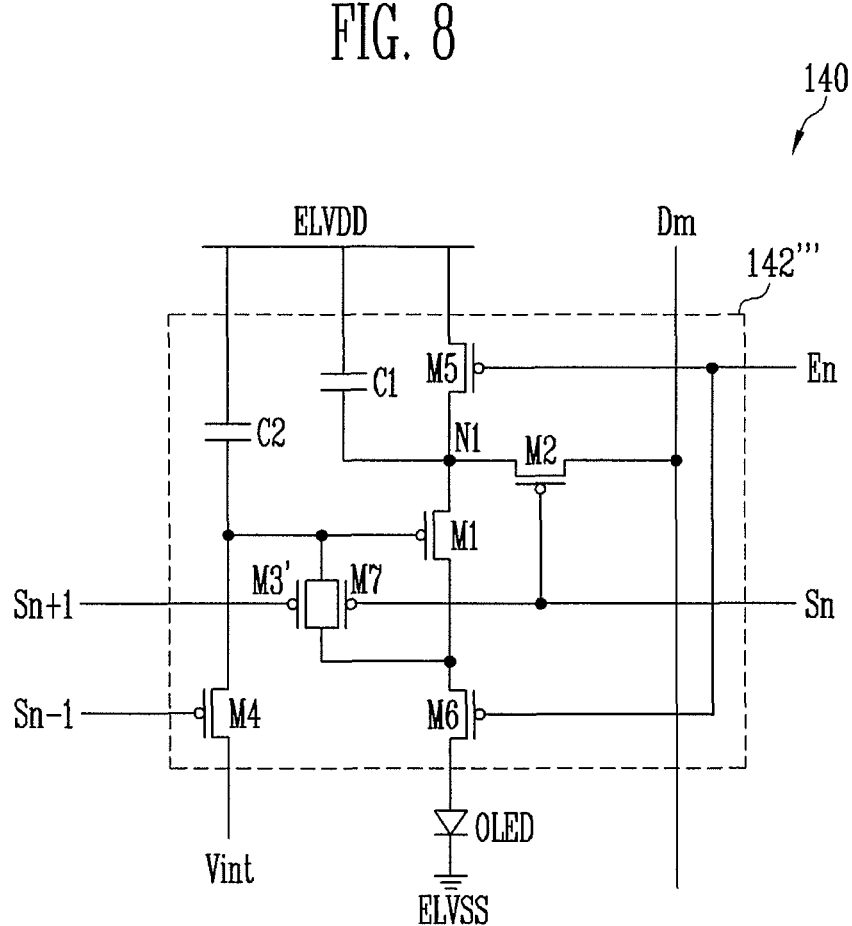
FIG. 8 is a circuit diagram illustrating still another embodiment of the pixel illustrated in FIG. 1.

FIG. 8 is a circuit diagram illustrating still another embodiment of the pixel illustrated in FIG. 1. In FIG. 8, components similar to those of FIG. 6 are designated by like reference numerals, and their detailed descriptions will not be provided again.

The pixel 140 of the embodiment shown in FIG. 8 includes an organic light emitting diode OLED, and a pixel circuit 142″ for supplying current to the organic light emitting diode OLED.

Here, a third transistor M3' included in the pixel circuit 142″ is coupled between the gate electrode and second electrode of the first transistor M1. A gate electrode of the third transistor M3' is coupled to an (n+1)-th scan line Sn+1. When a scan signal is supplied to the (n+1)-th scan line Sn+1, the third transistor M3' is turned on so that the first transistor M1 is diode-coupled.

Figure 9:
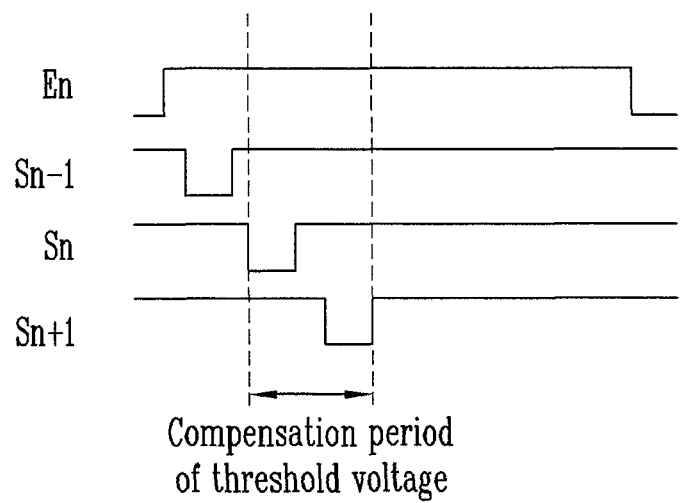
FIG. 9 is a waveform diagram illustrating a driving method of the pixel illustrated in FIG. 8.

FIG. 9 is a waveform diagram illustrating a driving method of the pixel illustrated in FIG. 8.

The operation process of the pixel will be described in conjunction with FIGS. 8 and 9. First, an emission control signal is supplied to the emission control line En so that the fifth and sixth transistors M5 and M6 are turned off. After the fifth and sixth transistors M5 and M6 are turned off, a scan signal is supplied to the (n−1)-th scan line Sn−1 so that the fourth transistor M4 is turned on. If the fourth transistor M4 is turned on, then the voltage of the initialization power source Vint is supplied to the gate electrode of the first transistor M1.

Subsequently, a scan signal is supplied to the n-th scan line Sn so that the second and seventh transistor M2 and M7 are turned on. If the second transistor M2 is turned on, then a data signal is supplied to the first node N1, and accordingly, a voltage corresponding to the voltage of the data signal is charged in the first capacitor C1. If the seventh transistor M7 is turned on, then the data signal supplied to the first node N1 is supplied to the gate electrode of the first transistor M1 via the first and seventh transistors M1 and M7. At this time, a voltage corresponding to the voltage of the data signal and the threshold voltage of the first transistor M1 is charged in the second capacitor C2. That is, during a period in which the scan signal is supplied to the n-th scan line Sn, the voltage corresponding to the voltage of the data signal is charged in the first capacitor C1, and the voltage corresponding to the voltage of the data signal and the threshold voltage of the first transistor M1 is charged in the second capacitor C2.

Subsequently, a scan signal is supplied to the (n+1)-th scan line Sn+1 so that the third transistor M3' is turned on. If the third transistor M3' is turned on, then the voltage charged in the first capacitor C1 is supplied to the gate electrode of the first transistor M1 via the third transistor M3'. Then, the voltage corresponding to the voltage of the data signal and the threshold voltage of the first transistor M1 is charged in the second capacitor C2.

After the voltage corresponding to the voltage of the data signal and the threshold voltage of the first transistor M1 is charged in the second capacitor C2, the supply of the emission control signal is stopped so that the fifth and sixth transistors M5 and M6 are turned on. Subsequently, the first transistor M1 supplies current corresponding to the voltage charged in the second capacitor C2 to the organic light emitting diode OLED.

Figure 10:
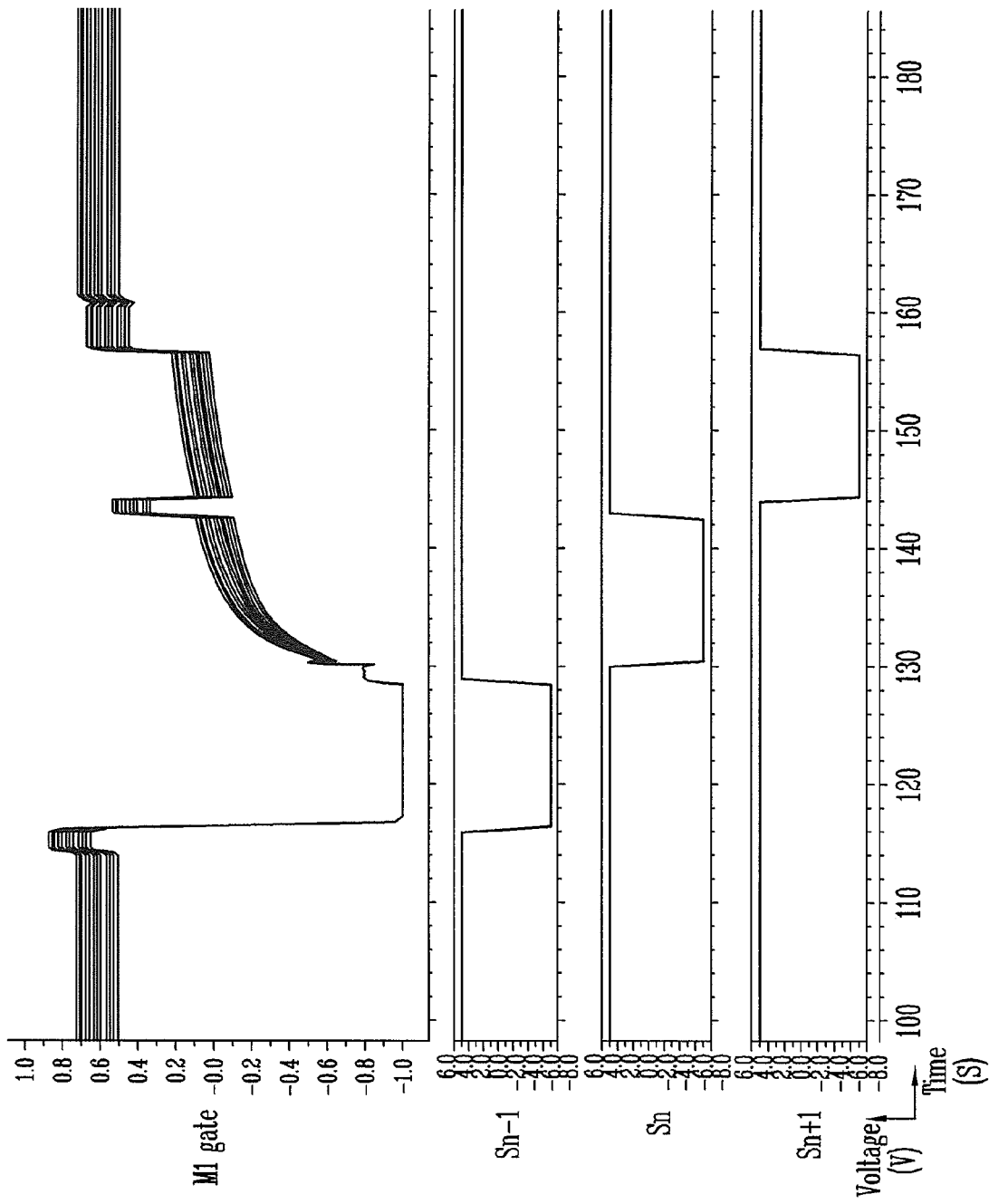
FIG. 10 is a view illustrating simulation results of the pixel illustrated in FIG. 8.

FIG. 10 is a view illustrating simulation results of the pixel illustrated in FIG. 8. In FIG. 10, for convenience of illustration, threshold voltages of a plurality of first transistors M1 are different from one another, and voltages applied to gate electrodes of the first transistors M1 are measured while supplying the same data signals.

Referring to FIG. 10, voltages applied to gate electrodes of the respective first transistors M1 are set so that the variation in the threshold voltage of each of the first transistors M1 is compensated. That is, the voltages applied to the gate electrode of the respective first transistors M1 are set different from one another so that the variation in the threshold voltage of each of the first transistors M1 is compensated. The voltage applied to the gate electrode of each of the first transistors M1 is continuously increased during a period in which a scan signal is supplied to the n-th scan line Sn and the (n+1)-th scan line Sn+1. That is, the threshold voltage of each of the first transistors M1 can be additionally compensated during the period in which the scan signal is supplied to the (n+1)-th scan line Sn+1. Accordingly, images with a desired luminance can be displayed.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A pixel comprising:
   an organic light emitting diode;
   a first transistor for controlling an amount of current flowing from a first power source to a second power source via the organic light emitting diode;
   a second transistor coupled between a first electrode of the first transistor and a data line and configured to be turned on when a current scan signal is supplied a current scan line;
   a third transistor coupled between a gate electrode of the first transistor and a second electrode of the first transistor;
   a first capacitor coupled between the first power source and the first electrode of the first transistor; and
   a second capacitor coupled between the gate electrode of the first transistor and the first power source.

2. The pixel according to claim 1, wherein the third and second transistors are configured such that at most one of the third and second transistors is turned on at any time.

3. The pixel according to claim 2, wherein the third transistor is configured to be turned on after the second transistor is turned on.

4. The pixel according to claim 2, further comprising a fourth transistor coupled between the gate electrode of the first transistor and an initialization power source and configured to be turned on when the current scan signal is supplied to the current scan line.

5. The pixel according to claim 1, wherein the third transistor is configured to be turned on for a longer time than the second transistor is configured to be turned on.

6. The pixel according to claim 1, wherein the first capacitor has a larger capacitance than the second capacitor.

7. The pixel according to claim 6, wherein the second capacitor is configured to be charged by a voltage supplied from the first capacitor after the second transistor is turned off.

8. The pixel according to claim 1, further comprising a fourth transistor coupled in parallel with the third transistor between the gate electrode of the first transistor and the second electrode of the first transistor and configured to be turned on to diode-connect the first transistor when the current scan signal is supplied to the current scan line.

9. The pixel according to claim 8, wherein the third transistor is configured to be turned on when a next scan signal is supplied to a next scan line after the current scan signal is supplied to the current scan line.

10. The pixel according to claim 1, further comprising a fourth transistor coupled between the gate electrode of the first transistor and an initialization power source and configured to be turned on when a previous scan signal is supplied to a previous scan line.

11. The pixel according to claim 1, further comprising:
    a fourth transistor coupled between the first electrode of the first transistor and the first power source; and
    a fifth transistor coupled between the second electrode of the first transistor and the organic light emitting diode,
    wherein the fourth and fifth transistors are configured to be turned off during a period in which the second and third transistors are turned on.

12. An organic light emitting display device, comprising:
    a scan driver for supplying a plurality of scan signals to a plurality of scan lines and supplying a plurality of emission control signals to a plurality of emission control lines;
    a data driver for supplying a plurality of data signals to a plurality of data lines in synchronization with the scan signals; and
    a plurality of pixels positioned at crossing regions of the scan lines and data lines,
    wherein each of the pixels positioned on an i-th (i is a natural number) horizontal line comprises:
       an organic light emitting diode;
       a first transistor for controlling an amount of current flowing from a first power source to a second power source via the organic light emitting diode;
       a second transistor coupled between a first electrode of the first transistor and a data line of the data lines and configured to be turned on when a scan signal of the scan signals is supplied an i-th scan line of the scan lines;
       a third transistor coupled between a gate electrode of the first transistor and a second electrode of the first transistor, the third and second transistors being configured such that at most one of the third and second transistors is turned on at any time;
       a first capacitor coupled between the first power source and the first electrode of the first transistor; and
       a second capacitor coupled between the gate electrode of the first transistor and the first power source.

13. The organic light emitting display device according to claim 12, wherein the third transistor is configured to be turned on when a scan signal is supplied to an (i+1)-th scan line.

14. The organic light emitting display device according to claim 13, further comprising a fourth transistor coupled in parallel with the third transistor between the gate electrode of the first transistor and the second electrode of the first transistor and configured to be turned on to diode connect the first transistor when the scan signal is supplied to the i-th scan line.

15. The organic light emitting display device according to claim 12, further comprising a control line driver configured to sequentially supply a plurality of control signals to a plurality of control lines extending in a direction parallel with the scan lines, each of the control signals having a width wider than a width of the scan signal.

16. The organic light emitting display device according to claim 15, wherein the control line driver is configured to supply a control signal of the control signals to an i-th control line of the control lines after the scan signal is supplied to the i-th scan line.

17. The organic light emitting display device according to claim 16, wherein the scan driver is configured to supply an emission control signal of the emission control signals to an i-th emission control line of the emission control lines so that the emission control signal overlaps with the scan signal supplied to the i-th scan line and the control signal supplied to the i-th control line.

18. The organic light emitting display device according to claim 17, wherein the third transistor is configured to be turned on when the control signal is supplied to the i-th control line.

19. The organic light emitting display device according to claim 17, further comprising a fourth transistor coupled between the gate electrode of the first transistor and an initialization power source and configured to be turned on when a scan signal of the scan signals is supplied to an (i−1)-th scan line of the scan lines.

20. The organic light emitting display device according to claim 17, further comprising:
  a fourth transistor coupled between the first electrode of the first transistor and the first power source and configured to be turned on when the emission control signal is supplied to the i-th emission control line; and
  a fifth transistor coupled between the second electrode of the first transistor and the organic light emitting diode and configured to be turned on when the emission control signal is supplied to the i-th emission control line.

21. The organic light emitting display device according to claim 12, further comprising a fourth transistor coupled between the gate electrode of the first transistor and an initialization power source and configured to be turned on when the scan signal is supplied to the i-th scan line.

22. The organic light emitting display device according to claim 12, wherein the first capacitor has a larger capacitance than the second capacitor.

* * * * *

UNITED STATES PATENT AND TRADEMARK OFFICE
CERTIFICATE OF CORRECTION

| | | |
|---|---|---|
| PATENT NO. | : 8,587,578 B2 | Page 1 of 1 |
| APPLICATION NO. | : 12/869631 | |
| DATED | : November 19, 2013 | |
| INVENTOR(S) | : Sang-Moo Choi | |

It is certified that error appears in the above-identified patent and that said Letters Patent is hereby corrected as shown below:

On the Title Page item (57) Abstract, line 9                After "supplied"

Insert -- to -- item (57) Abstract, line 9                Delete "line"

Insert -- line, --

In the Claims

Column 11, Claim 1, line 29               After "supplied"

Insert -- to --

Column 12, Claim 12, line 33              After "supplied"

Insert -- to --

Signed and Sealed this
Second Day of June, 2015

Michelle K. Lee
*Director of the United States Patent and Trademark Office*